Inventor:
G. Lisi
By E. F. Wenderoth
Atty

Patented Mar. 20, 1945

2,371,898

UNITED STATES PATENT OFFICE 2,371,898

PARACHUTE WITH VARIABLE SURFACE

Giuseppe Lisi, Spoleto, Italy; vested in the Alien Property Custodian

Application June 12, 1940, Serial No. 340,196
In Italy October 12, 1939

1 Claim. (Cl. 244—152)

Object of the present invention is the realisation of a parachute allowing: 1st the jump of persons or drop of things at a higher speed than the one considered till now as a maximum in the normal use of a parachute: 2d the possibility for the flyer (or airman) to vary at his will and by a simple manipulation the descent speed.

The difficulty till now met with in the use of a parachute in the case of jumps at a high speed consists above all in the high value of the snatch effort a man has to endure. In order to avoid this inconvenience, in the parachutes now used with but one canopy there is no other means but to reduce the surface of the canopy with the inconvenience however of increasing the normal descent speed.

As to the possibility of varying at will the descent speed the solutions till now suggested have not been adopted as they were not practical and too complicated. In the parachute with a variable surface according to the present invention there is offered the realisation of a practical simple solution of the problems above mentioned.

In the accompanying drawing there are shown by way of example two explicative figures.

Figure 1:
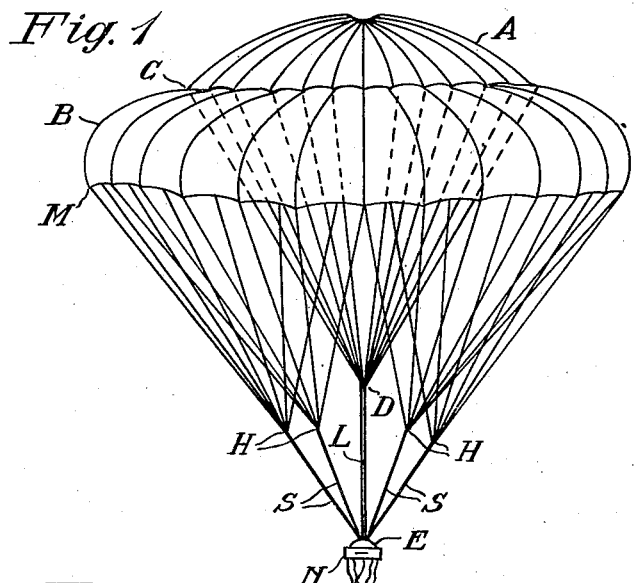

In Fig. 1 the parachute is illustrated when totally opened that is during an ordinary vertical descent.

Figure 2:
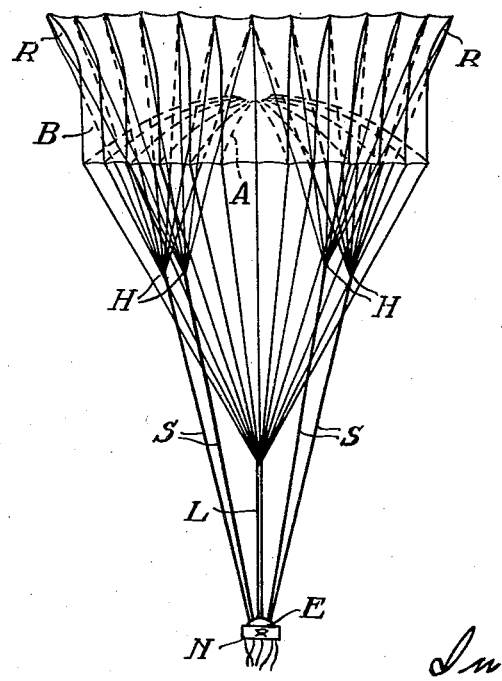

Fig. 2 shows the moment of opening when starting from an aeroplane at a high speed.

As illustrated in Fig. 1 the parachute comprises a canopy A and an annular sloping portion B with no solution of continuity.

In the juncture C of the sloping portion B and calotte A the nonresilient cords are united in D from where by means of a nonelastic supporting system L, which may contain a device for the controlled manipulation, they are rejoined to the belt N.

The slope B united with or adjacent to the canopy A is caught on the outside edge M by a series of nonresilient cables assembled in different groups H.

The sections S from H to the attachment E joining the groups H to the belt N consist of a resilient material.

Fig. 2 shows the function of said resilient sections S yielding under the aerodynamic resistance met by the slope B at the starting moment allowing said slope to be temporary tilted till the position R is taken.

When the elements have once reached this position the whole resistance of the first air shock is supported by the surface of the canopy alone and consequently by a part of the total surface of the parachute.

While the system formed by man and parachute gradually sinks down towards the normal descent speed the resilient sections S return to the position shown in Fig. 1 so that the slope B also opens in its whole surface offering the maximum resistance in order to obtain a descent at an easy and secure landing speed.

The tilting on high of the slope B produced in the case above mentioned by the aerodynamic resistance may be also obtained in any moment whatever of the normal descent whatever may be the proportion of the tilting by a simple hand control device to be operated at will by the airman.

According to the proportion the tilting has been obtained there will be also obtained a smaller resistant surface and consequently a greater falling speed.

Having now particularly described and ascertained the nature of my said invention and in what manner the same is to be performed, I declare that what I claim is:

A parachute comprising, a main canopy for providing support for an object under all circumstances, a plurality of non-elastic rigging lines attached at spaced points above the periphery of said main canopy and providing a non-elastic attachment between the canopy and the object being supported, an outer canopy portion in the form of an annular peripherial skirt secured at its inner periphery to the outer periphery of said main canopy, and a rigging line assembly attached at spaced points about the outer periphery of said peripherial skirt and providing an elastic connection between said peripherial skirt and the object being supported, whereby excessive force on said peripherial skirt causes said rigging line assembly to expand with the result that said skirt portion is rendered ineffective in supporting the object and when an excessive force is not exerted on said peripherial skirt said peripherial skirt is effective to assist in supporting the object.

GIUSEPPE LISI.

CERTIFICATE OF CORRECTION.

Patent No. 2,371,898. March 20, 1945.

GIUSEPPE LISI.

It is hereby certified that error appears in the printed specification of the above numbered patent requiring correction as follows: Page 1, second column, line 31, for "above" read --about--; and that the said Letters Patent should be read with this correction therein that the same may conform to the record of the case in the Patent Office.

Signed and sealed this 5th day of June, A. D. 1945.

(Seal)

Leslie Frazer
Acting Commissioner of Patents.